United States Patent [19]

Morton

[11] Patent Number: 5,424,553

[45] Date of Patent: Jun. 13, 1995

[54] METHOD FOR ALIGNING A LENTICULAR MATERIAL FOR PRINTING

[75] Inventor: Roger A. Morton, Penfield, N.Y.

[73] Assignee: Eastman Kodak Company, Rochester, N.Y.

[21] Appl. No.: 243,020

[22] Filed: May 16, 1994

[51] Int. Cl.$^6$ .............................................. G01V 8/12
[52] U.S. Cl. .................................... 250/548; 250/561; 254/112
[58] Field of Search ................. 250/548, 557, 561; 356/400, 401, 12, 13, 14, 374; 354/112, 114, 115; 359/519, 621, 622, 623

[56] References Cited

U.S. PATENT DOCUMENTS

| 4,701,605 | 2/1986 | Ida | 250/201 |
| 4,816,939 | 8/1986 | Ford et al. | 360/77.03 |
| 5,302,989 | 4/1994 | Taguchi et al. | 354/112 |

Primary Examiner—David R. Hudspeth
Assistant Examiner—Jacqueline M. Steady
Attorney, Agent, or Firm—Edward Dugas

[57] ABSTRACT

A method for aligning a lenticular material for the printing of an image onto a printing surface of a lenticular material for the purpose of forming a 3-D image is disclosed comprising the steps of:

a) directing a radiation beam to the lenticular material such that at least one of the lenticules focuses the radiation beam at the printing surface of the lenticular material;

b) positioning a radiation sensitive array at a reference position that will yield a maximum sensed radiation when the position of the focused radiation beam on the printing surface of the lenticular material is in correct printing alignment; and c) adjusting the position of the lenticular material to maximize the radiation sensed by the radiation sensitive array.

10 Claims, 5 Drawing Sheets

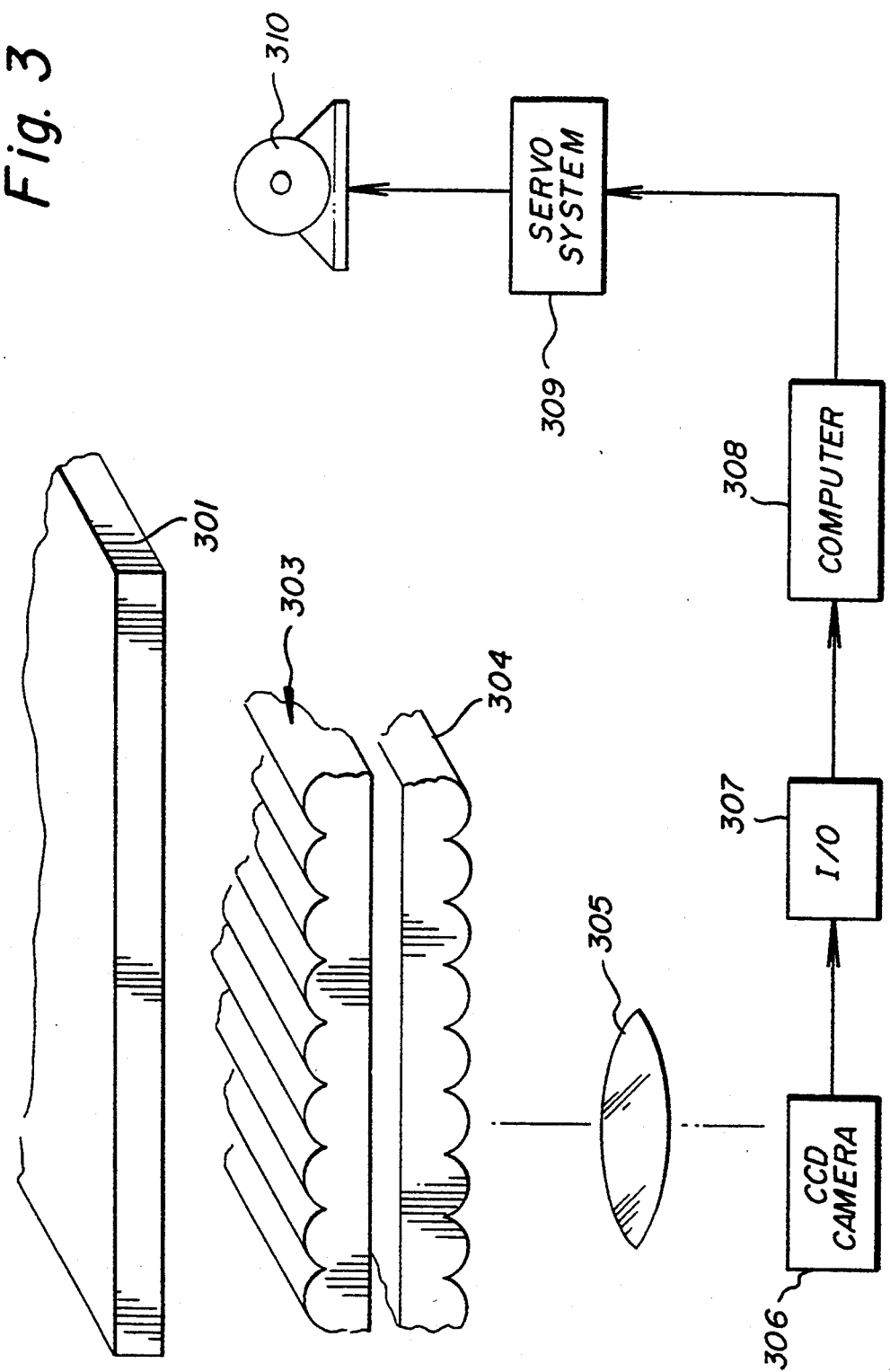

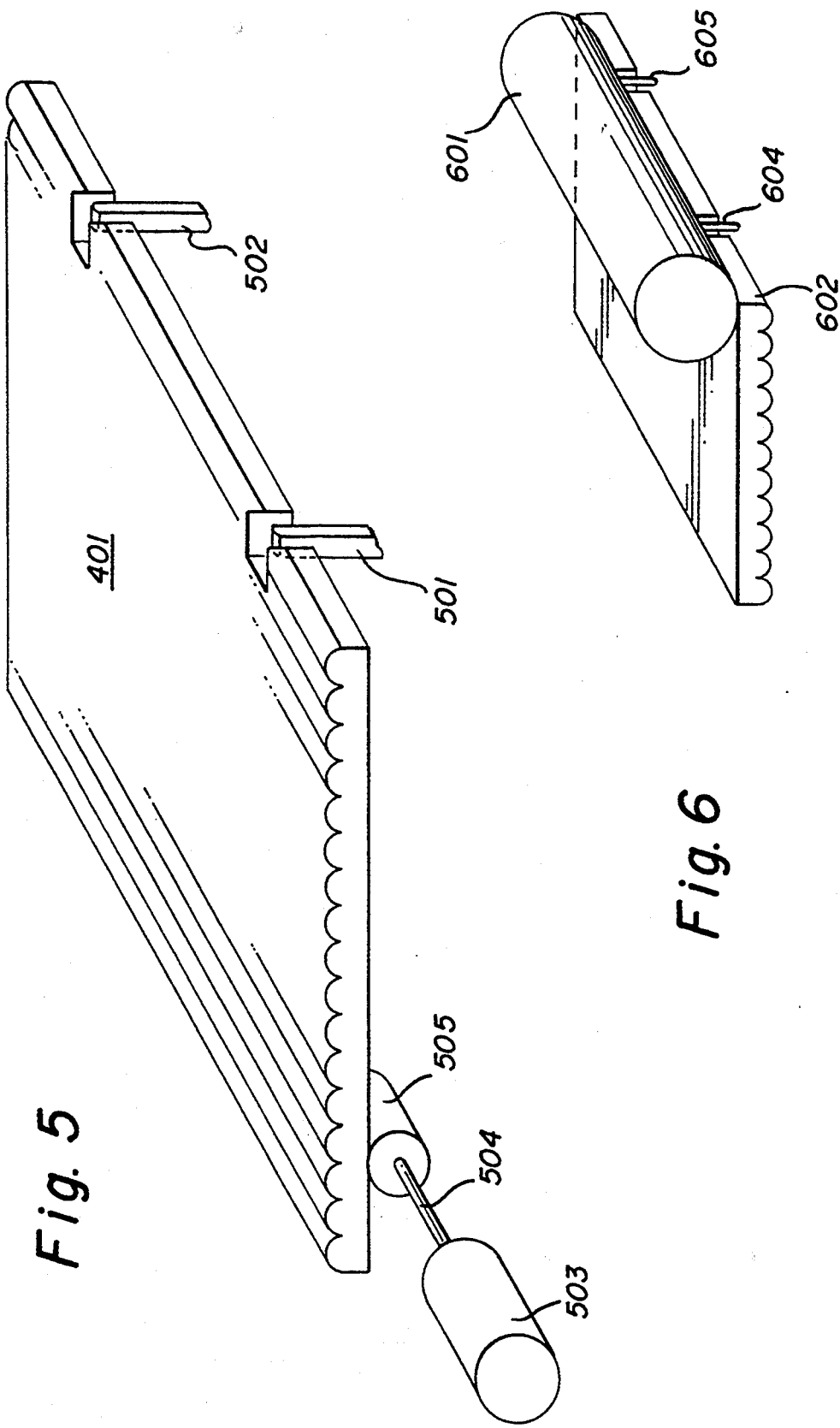

METHOD FOR ALIGNING A LENTICULAR MATERIAL FOR PRINTING

FIELD OF THE INVENTION

This invention relates to the field of 3-D imaging using conventional printing press methods and more particularly to a technique for aligning a lenticular material with respect to an image to be printed on the lenticular material.

BACKGROUND OF THE INVENTION

There are a variety of ways to make three-dimensional images using lenticular material. These include exposing photographic film through the lenticular material and then developing the film, accurately writing the required image on photographic film using digital printing techniques and then aligning the film after developing to the lenticular material.

One disadvantage of the photographic approaches when a high volume of images is required, is that of cost. Attempts have been made to use high volume printing presses with very small half-tone dots to make low cost 3-D lenticular images. Examples of this approach being employed by a company called Quad Graphics.

However, a problem arises because of the difficulty of achieving registration to the lenticular material when printing directly on the material. The demands for accurate lenticular registration are very precise. Typically to produce a high quality image, the image must be registered to lenticules with an accuracy of plus or minus 0.0005 inches. If the misregistration exceeds this figure image quality drops significantly.

SUMMARY OF THE INVENTION

The present invention involves aligning the lenticular material prior to having it passed through a printing press for printing the image on the lenticular material. One preferred method for aligning a lenticular material for the printing of an image onto a printing surface of the lenticular material, comprises the steps of:
 a) directing a radiation beam to the lenticular material such that at least one of the lenticules focuses the radiation beam at the printing surface of the lenticular material;
 b) positioning a radiation sensitive array at a reference position that will yield a maximum sensed radiation when the position of the focused radiation beam on the printing surface of the lenticular material is in correct printing alignment; and
 c) adjusting the position of the lenticular material to maximize the radiation sensed by the radiation sensitive array.

Another alignment technique involves manipulation of the lenticular material at the feed point of the press by sensing the position of the lenticules.

Another technique involves machining reference slots in the edge of the lenticular material that engage fixed reference projections to insure the alignment of the lenticules with the to be printed image.

Yet another technique is to sense the alignment of the lenticules on the fly and automatically adjust the phasing of the press to insure that the half-tone, image-printing plate comes into registration with the lenticular material at a point corresponding to the correct lenticule position.

The basic principle of this invention is to sense the position of the lenticule material by using an optical method to take advantage of the fact that a lenticule is, in fact, a lens and then position the lenticular material so that it is in accurate registration with the image-printing plate.

From the foregoing it can be seen that it is a primary object of the present invention to provide an improved method for aligning the position of a lenticular with respect to a printing press in order to increase the accuracy of placement of a printed image on the lenticular material.

It is another object of the present invention to provide an improved 3-D image by increasing the accuracy of alignment between a lenticular material and the image segments forming the image.

The above and other objects of the present invention will become more apparent when taken in conjunction with the following description and drawings wherein like characters indicate like parts and which drawings form a part of the present invention.

BRIEF DESCRIPTION OF THE DRAWINGS

FIG. 3 illustrates a system for sensing the position of a first piece of lenticule material by using a second piece of lenticular material.

FIG. 5 illustrates a technique for aligning the lenticular material at the feed point of the press.

FIG. 6 illustrates a technique for aligning the lenticular material with respect to fingers on a roll on the press.

DETAILED DESCRIPTION OF THE INVENTION

Figure 1:
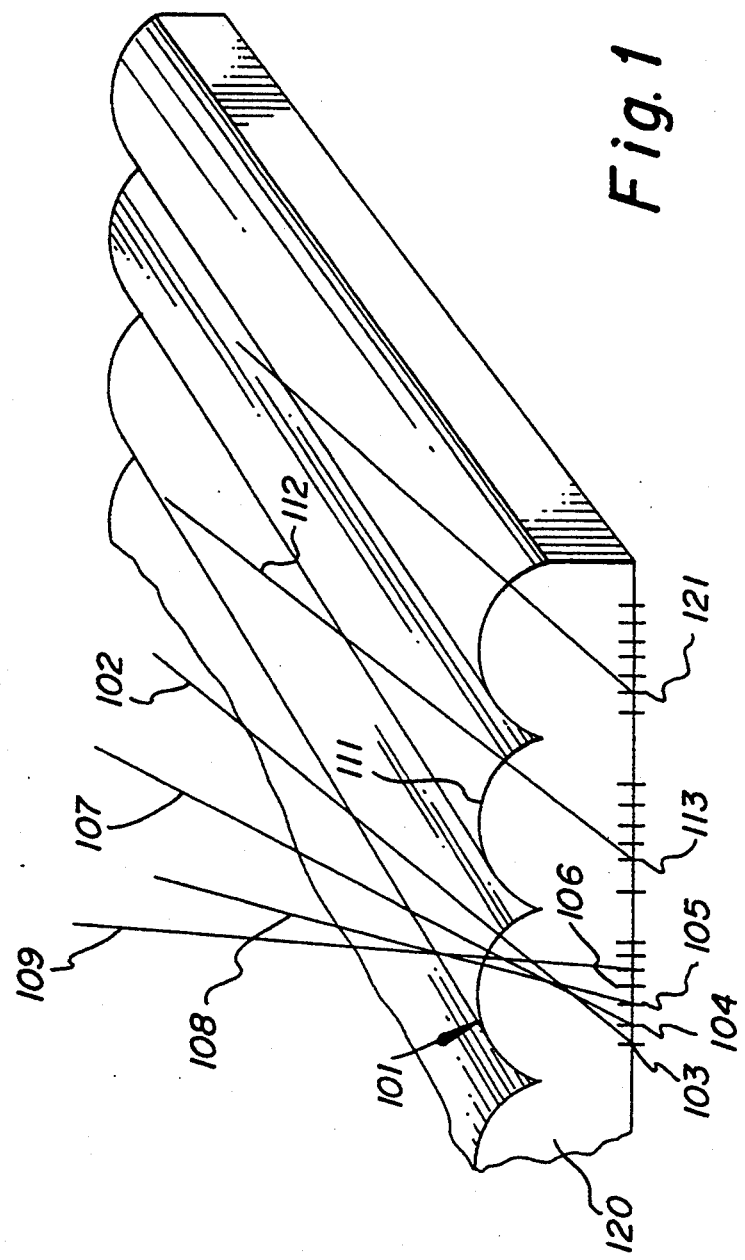
FIG. 1 illustrates the lenticule configuration and optical rays of a depth image.

Three-D imagery depends on the ability to project distinct images in different viewing directions. This can be seen in FIG. 1, where an image view is projected to lenticule 101 along ray 102 from image position 103. Similarly for lenticule 111, viewing ray 112 is projected from point 113. A number of points (depending on the number of views behind each lenticule), such as points 104, 105, and 106, correspond to different views of the image producing rays 107, 108, and 109, respectively. It can be appreciated that a very high degree of alignment is required between the position of the lenticular material 120 and the position of the media 121. Any small variation in these positions results in a angular displacement of the rays and therefore results in a substantial loss of image quality.

In order to accurately print the image on the smooth side of the lenticular material with the required alignment when using a printing press, it is necessary that the lenticular material be fed into the press with high accuracy and in synchronism with the printing roll. To achieve this synchronism, it is first necessary to determine accurately the position of the lenticules.

Figure 2:
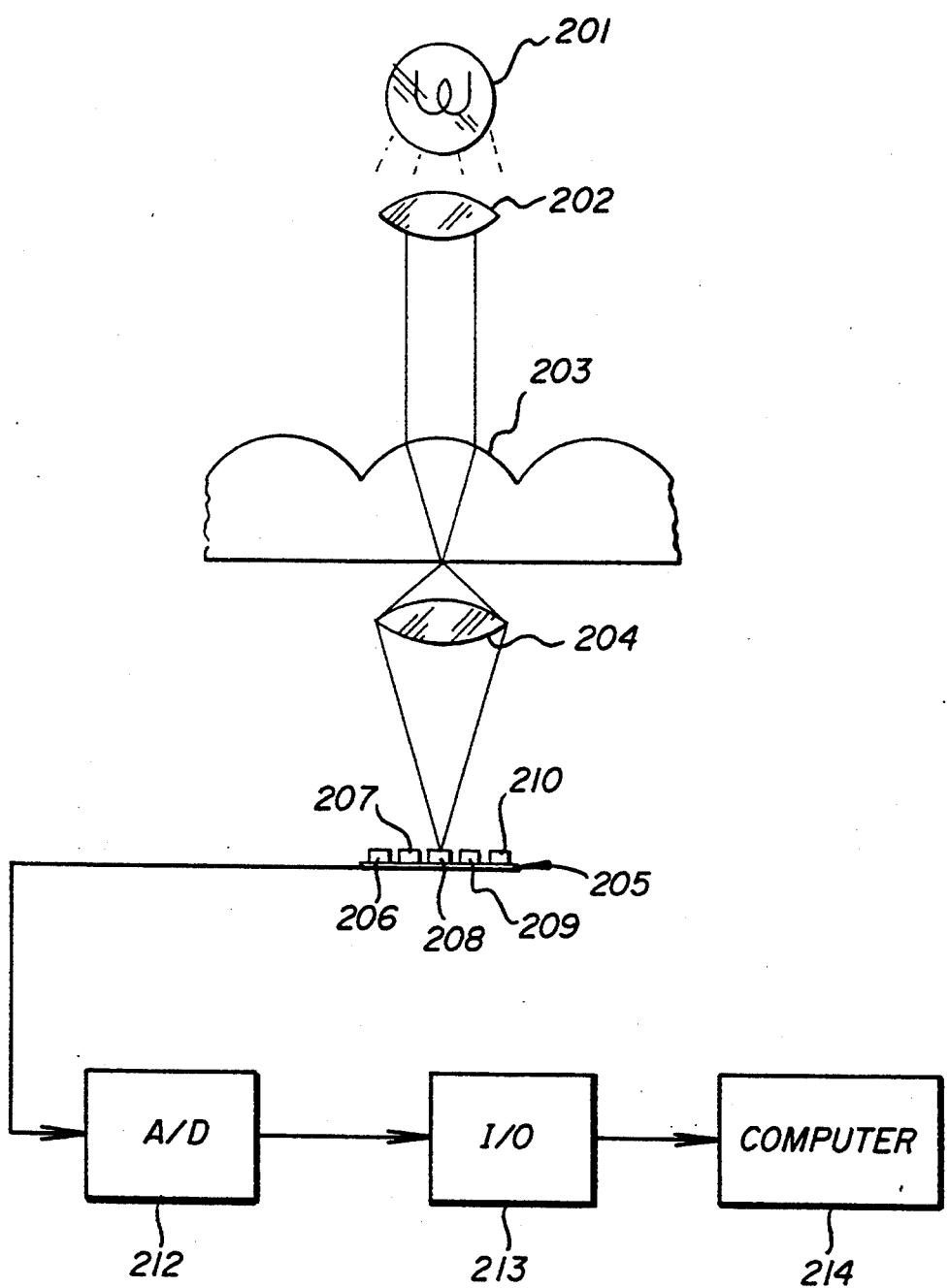
FIG. 2 illustrates a system for sensing the position of a lenticule using a microscope objective.

FIG. 2 illustrates a technique for sensing the position of a lenticule using a microscope objective. Parallel light from lamp 201 and condenser lens 202 passes to lenticule 203. This parallel light focuses on the back side of the lenticule. The microscope objective 204 images the focal point back to a multi-position sensor 205. This sensor is formed as number of individual light sensitive areas 206 through 210, which can be either separate light sensitive cells or a single CCD (charge coupled device) sensor. The signal from these sensors passes to an A/D converter 212, for conversion to a digital form and therefrom to a computer interface 213. These signals are then passed to a computer 214, whose program determines the position of the sensor receiving the maximum amount of light, thereby determining the position of the lenticule with respect to the microscope objective.

It will be appreciated that sensing the position of the lenticule at one point is insufficient to achieve the positioning registration along the whole length of the lenticule. It is therefore necessary to use multiple objectives across the width of the lenticular material with a spacing sufficiently close that given the angular uncertainties of the angular position of the lenticular material all adjacent objectives will be looking at the same lenticule. Consequently the series of microscope objectives aligned along a given lenticule are, when sensing that the lenticule is in the same position, in fact, looking at the same lenticule.

Referring to FIG. 3, another technique for sensing the alignment of the lenticular material is to use a second piece of lenticular material of slightly different pitch. The entire area of the lenticule is illuminated using, for example, a diffuse illuminator 301, which produces diffuse light. Lenticular material 303, whose position it is desired to determine, is brought into close alignment with a small piece of lenticular material 304 of slightly different pitch than the lenticular material 303. A lens 305 images the MOIRÉ pattern formed from the interaction of lenticular material 303 with lenticular material 304 onto a CCD camera 306. A computer interface 307 receives the video signal from the CCD camera 306 and passes information describing the scene to a computer processor 308. The output of computer 308 controls a servo system 309 which positions lenticular sheet 303 through motors (for example 310) to bring the lenticular sheet into correct positioning with respect to the fixed lenticular sheet 304. The position is considered correct when the local intensity of the MOIRE pattern is at its maximum value. (Alternatively a present intensity can be used as a reference because the purpose of this alignment method is to establish a fixed phase relationship between the two pieces of lenticular material and, then having established a stable phase relationship, it is possible to adjust the press for optimal image quality.)

Figure 4A:
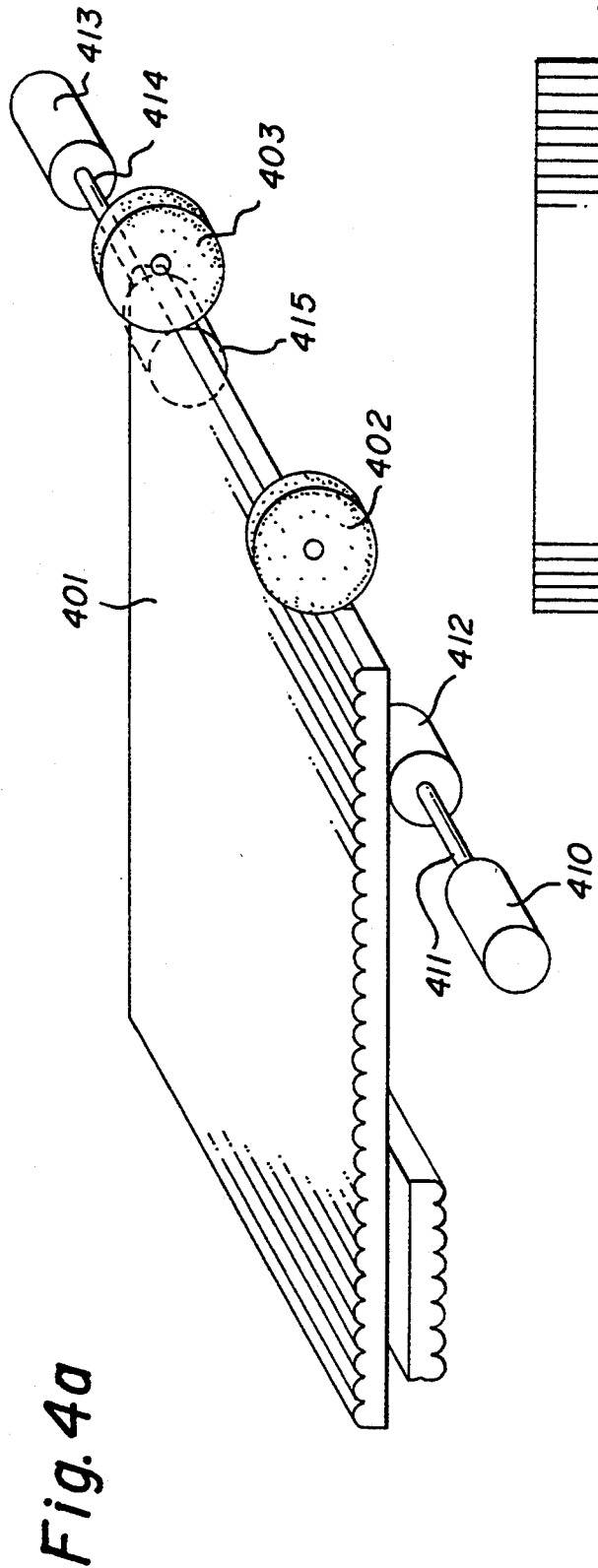
FIG. 4A illustrates a servo technique for aligning lenticular material to a machine for making slots in the lenticular material.
Figure 4B:
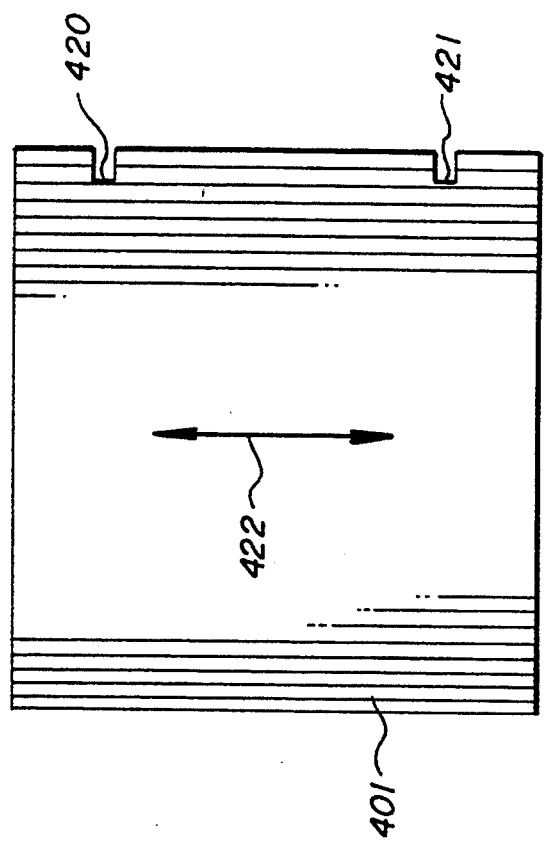
FIG. 4B illustrates the direction of motion for the lenticular sheet.

FIG. 4a shows a system for machining reference marks on a lenticular sheet using the positioning techniques already described. A grinding wheel 402 is positioned near the edge of the lenticular material 401 so that the motor 410 controlling the position of the lenticular material through shaft 411 and drive wheel 412 drives the lenticular material against the grinding wheel. A second grinding wheel 403 machines a second notch in lenticular sheet 401. A second motor 413 also controlled by computer 308 (computer 214), positions the lenticular material 401 in the vicinity of grinding wheel 403 by turning shaft 414 and drive wheel 415. It would be appreciated that these two motors 410 and 413 are, in fact, adjusting both the position and the orientation of lenticular sheet 401 so that the two notches (420 and 421, see FIG. 4b) made by grinding wheels 401 and 403 occur in alignment with the direction of the lenticules. This direction is shown in FIG. 4b by arrow 422.

The notches 420 and 421 may then be used in two possible ways to correctly align and position the lenticular material in the printing press. Referring to FIG. 5, the first way is to position these notches against a finger 501 and 502 to establish correct alignment of the sheet 401. This alignment is performed by having a drive motor 503 operate a shaft 504 to a drive wheel 505 to establish pressure between the lenticular material 401 and finger 501. A similar arrangement (not shown) of motor, drive shaft and drive wheel is used to establish pressure against finger 502. Once the lenticular sheet 401 is correctly positioned, the fingers are withdrawn and the sheet moves on into the press.

Alternatively, the arrangement shown in FIG. 2 or 3, may be used to position the lenticular sheet 401 at the feed point of the press.

It can also be possible to establish a reference edge in alignment with the lenticules during the compression moulding or extrusion process used to make the lenticular sheets. Once the reference notches or the reference edge is established, they are used in the feed process of the printing press to establish correct positioning of the lenticular material.

A specific example of this technique is shown in FIG. 6 where the drum 601 within the press receives the lenticular material 602. Fingers 604 and 605 on the drum provide reference points corresponding to notches 420 and 421. The feed mechanism pushes the lenticular material against these fingers to accurately position the lenticular material with respect to the drum.

While there has been shown what are considered to be the preferred embodiments of the invention, it will be manifest that many changes and modifications may be made therein without departing from the essential spirit of the invention. It is intended, therefore, in the annexed claims, to cover all such changes and modifications as may fall within the true scope of the invention.

Parts List

101 Lenticule
102 Ray
103 Image position
111 Lenticule
112 Viewing ray
113 Point
104 Point
105 Point
106 Point
107 Ray
108 Ray
109 Ray
120 Position of lenticular material
121 Position of media
201 Lamp
202 Condenser lens
203 Lenticule
204 Microscope objective
205 Multi-position sensor
206 Light sensitive area
207 Light sensitive area
108 Light sensitive area
109 Light sensitive area
210 Light sensitive area
212 A/D converter
213 Computer interface
214 Computer Parts List Cont'd 301 Diffuse illuminator
303 Lenticular material
304 Lenticular material
305 Lens
306 CCD camera
307 Computer interface
308 Computer
309 Servo system
401 Lenticular material
402 Grinding wheel
403 Grinding wheel
410 Motor
411 Shaft
412 Drive wheel
413 Motor
414 Turning shaft
415 Drive wheel
420 Notch
421 Notch
422 Arrow
501 Finger
502 Finger
503 Drive motor
504 Shaft
505 Drive wheel
601 Drum
602 Lenticular material
604 Finger
605 Finger

I claim:

1. A method for aligning a lenticular material for the printing of an image onto a printing surface of the lenticular material, comprising the steps of:
   a) directing a radiation beam to the lenticular material such that at least one of the lenticules focuses the radiation beam at the printing surface of the lenticular material;
   b) positioning a radiation sensitive array at a reference position that will yield a maximum sensed radiation when the position of the focused radiation beam on the printing surface of the lenticular material is in correct printing alignment; and
   c) adjusting the position of the lenticular material to maximize the radiation sensed by the radiation sensitive array.

2. The method according to claim 1 and further comprising the step of:
   forming reference marks on the lenticular material indicating alignment of the lenticular material.

3. The method according to claim 2 wherein the reference marks are formed by grinding notches into an edge of the lenticular material.

4. The method according to claim 3 and further comprising the step of:
   aligning the lenticular material for printing by positioning the notches to reference points associated with the printing system.

5. The method according to claim 1 wherein the adjusting of the position of the lenticular material is performed automatically by directing the output of the radiation sensitive array to a servomechanism that provides motion to the lenticular material to urge the material into a position that yields a maximum sensed radiation.

6. A method for aligning a lenticular material for the printing of an image onto a printing surface of the lenticular material, comprising the steps of:
   a) illuminating a first lenticular material with a diffuse light;
   b) positioning a second lenticular material, of slightly different pitch, adjacent the first lenticular so as to form a MOIRE pattern;
   c) detecting the formed MOIRE pattern to provide a signal that is a function of its magnitude; and
   d) adjusting the position of the first lenticular material such that the provided signal indicates a minimum MOIRE pattern.

7. The method according to claim 6 and further comprising the step of:
   forming reference marks on the first lenticular material indicating its alignment.

8. The method according to claim 7 wherein the reference marks are formed by grinding notches into an edge of the first lenticular material.

9. The method according to claim 8 and further comprising the step of:
   aligning the lenticular material for printing by positioning the notches to reference points associated with a printing system.

10. The method according to claim 6 wherein the adjusting of the position of the first lenticular material is performed automatically by detecting the MOIRE pattern to provide a signal that is a function of the magnitude of the MOIRE pattern and by directing the provided signal to a servomechanism that in turn provides motion to the first lenticular material so as to urge the material into a position that yields a minimum MOIRE pattern.

* * * * *